United States Patent

Menig

Patent Number: 5,435,212
Date of Patent: Jul. 25, 1995

[54] SEMI-AUTOMATIC SHIFT IMPLEMENTATION

[75] Inventor: Paul M. Menig, Portage, Mich.

[73] Assignee: Eaton Corporation, Cleveland, Ohio

[21] Appl. No.: 968,898

[22] Filed: Oct. 30, 1992

[51] Int. Cl.⁶ .............................. F16H 59/70
[52] U.S. Cl. .......................... 74/745; 74/335
[58] Field of Search ........... 74/335, 745, 336 R, 74/337, 866; 477/78, 77

[56] References Cited

U.S. PATENT DOCUMENTS

| | | | |
|---|---|---|---|
| 4,455,883 | 6/1984 | Radcliff | 74/475 |
| 4,498,356 | 2/1985 | Vater et al. | 74/335 X |
| 4,561,325 | 12/1985 | Jester | 74/745 |
| 4,722,248 | 2/1988 | Braun | 74/745 |
| 4,742,731 | 5/1988 | Eldridge et al. | 74/335 X |
| 4,764,665 | 7/1988 | Vandervoort | 74/745 |
| 4,802,384 | 2/1989 | Schwarz et al. | 74/335 X |
| 4,944,197 | 7/1990 | Stine et al. | 74/477 |
| 5,038,627 | 8/1991 | Schwaiger et al. | 74/335 OR |
| 5,052,245 | 10/1991 | Kigoshi | 74/335 X |
| 5,053,961 | 10/1991 | Genise | 364/424.1 |

Primary Examiner—Rodney H. Bonck
Attorney, Agent, or Firm—Howard D. Gordon

[57] ABSTRACT

A vehicular transmission shift control system/method is provided for effecting automatic shifting between sequentially related forward gear ratios within manually selected groups is provided in splitter type compound transmissions that include a logic member (178) operative to receive and process an engine speed signal and other signals (176) and to provide an output control signal (192) to a shift actuator (184) that is operative to enable automatic shifting between the sequentially related forward gear ratios within each of a plurality of manually selectable groups whenever one of the groups (202, 204) is manually engaged by an operator of the vehicle.

3 Claims, 5 Drawing Sheets

SEMI-AUTOMATIC SHIFT IMPLEMENTATION

BACKGROUND OF THE INVENTION

1. Field of the Invention

The present invention relates to a semi-automatic shift implementation control system/method for semi-automatic shifting of a splitter type, preferably a combined splitter and range type, compound transmission. More particularly, the present invention relates to a semi-automatic shift implementation control for shifting a splitter-type compound mechanical transmission wherein all splitter shifting is automatically implemented while all main section shifting is manually implemented. Preferably, if the compound transmission also includes auxiliary range gearing, range shifting is also at least partially automatically implemented.

2. Description of the Prior Art

Compound range-type mechanical transmissions using so-called "double H" type controls wherein a range shift is automatically selected by movement of the shift lever, without requiring the operator to use a button or lever to select a range change, are well known in the prior art as may be seen by reference to U.S. Pat. Nos. 4,561,325 and 4,455,883 and 4,944,197, the disclosures of which are incorporated herein by reference.

Compound mechanical transmissions of the combined splitter and range type are widely used for heavy duty vehicles and very well known in the prior art as may be seen by reference to U.S. Pat. Nos. 4,754,665 and 4,944,197, the disclosures of which are incorporated herein by reference.

Semi-automatic shift implementation systems the compound mechanical transmissions wherein, upon manual shifting into a highest grouping of gear ratios, automatic shifting with that highest grouping only is provided are known in the prior art and disclosed in U.S. Pat. Nos. 4,722,248 and 5,038,627, the disclosures of which are incorporated herein by reference. Semi-automatic shift implementation systems for mechanical transmissions wherein the vehicle operator is required to manually cause a torque interruption and/or achieve synchronous conditions are known in the prior art and are disclosed in U.S. Pat. No. 5,053,961, the disclosure of which is incorporated herein by reference.

These prior art transmission systems were not suited for certain applications as they required a relatively high level of skill and experience to operate, required a significant amount of automation hardware and/or did not permit the operator to shift the transmission in a manner equivalent to shifting a passenger car manual transmission.

SUMMARY OF THE INVENTION

In accordance with the present invention, many of the features of the prior art are utilized in a novel manner to provide a semi-automatic shift implementation control system/method for a multi-speed compound transmission system which retains the efficiencies of a mechanical transmission, will allow such a transmission system to be provided with relatively inexpensive sensors, actuators and controls, will allow the operator to make many of the shift decisions and will allow the transmission to be shifted with the ease of a typical passenger automobile simple manual transmission.

The above is provided by providing a control system/method for a splitter type compound mechanical transmission system wherein main section ratio shifts are manually implemented, and relatively simple and inexpensive controls, sensors and actuators are provided to automate the splitter shifts for each main section ratio. Preferably, if a combined splitter and range type compound transmission is to be controlled, range shifting will be automatically selected by shift lever movement as is known in commercially available "double H" type controls.

Accordingly, it is an object and advantage of the present invention to provide a new and improved semi-automatic shift implementation system for a splitter type, or a combined splitter and range type, compound transmission which is relatively simple and inexpensive and allows the transmission to be driven in a manner similar to a simple passenger car manual transmission.

These and other objects and advantages of the present invention will become apparent from a reading of the description of the preferred embodiments taken in connection with the drawings.

DESCRIPTION OF THE PREFERRED EMBODIMENT

Figure 1:
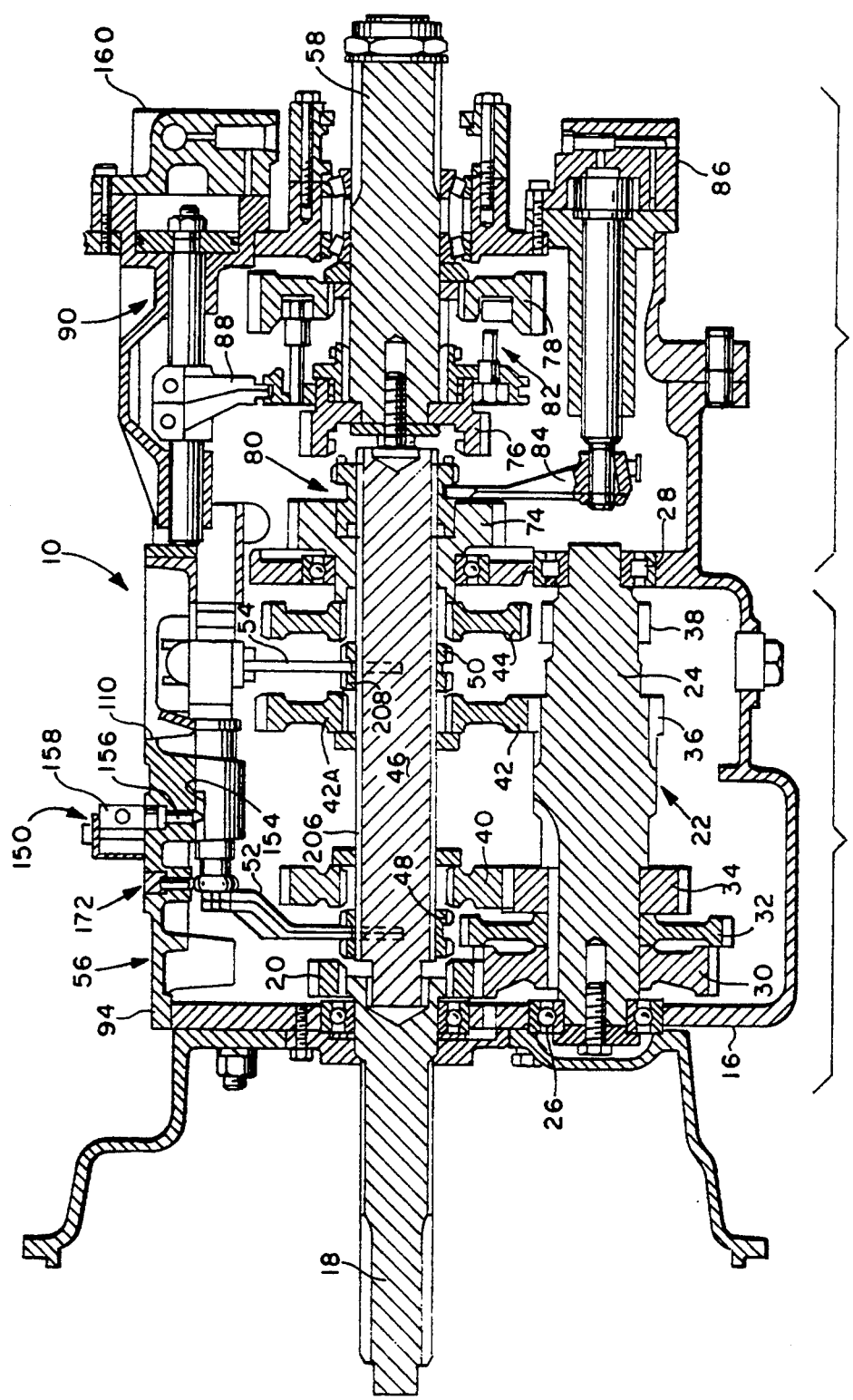
FIGS. 1 and 1A are a plan view of a combined range and splitter type compound transmission.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectfully to the left and right sides of the transmission as illustrated in FIGS. 1 and 12. The words "inwardly" and "outwardly" will refer to directions toward and away from, respectively, the geometric center of the device and designated pans thereof. Said terminology includes the words above specifically mentioned, derivatives thereof and words of similar import.

The term "compound transmission" is used to designate a change speed or change gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio and the term "downshift" as used herein shall mean the shifting from a higher speed gear ratio to a lower speed gear ratio. The terms "low speed gear" or "low gear" as used herein shall designate a gear utilized for relatively lower forward speed operation in a transmission, i.e., a set of gears having a higher ratio of reduction of output shaft speed relative to the speed of the input shaft.

Figure 1A:
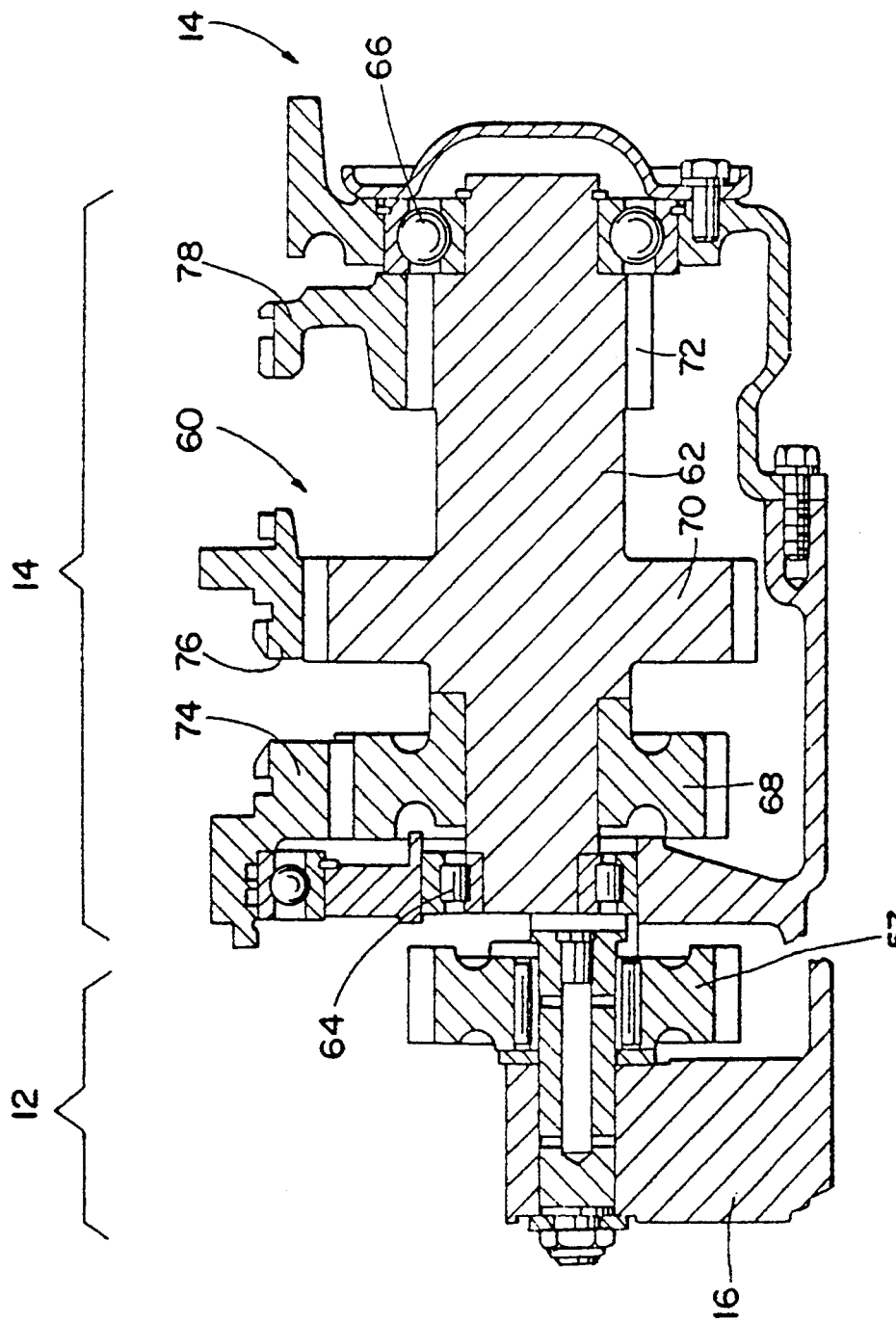

FIGS. 1 and 1A illustrate a combined range and splitter type compound transmission 10 which is especially well suited for control by the semi-automatic shift implementation control system/method of the present invention. Transmission 10 comprises a main transmission section 12 connected in series with an auxiliary transmission section 14 having both range and splitter type gearing. Typically, transmission 10 is housed within a single multi-piece housing 16 and includes an input shaft 18 driven by a prime mover such as a diesel engine (not shown) through a selectively disengaged, normally engaged, friction master clutch (not shown).

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are hereby incorporated by reference, input gear 20 simultaneously drives a plurality of substantially identical mainsection countershaft assemblies at substantially identical rotational speeds. Each of the mainsection countershaft assemblies comprises a mainsection countershaft 24 supported by bearings 26 and 28 in housing 16 and is provided with mainsection countershaft gears 30, 32, 34, 36 and 38 fixed thereto. A plurality of mainsection drive or mainshaft gears 40, 42 and 44 surround the transmission mainshaft 46 and am selectively clutchable, one at a time, to the mainshaft 46 for rotation therewith by sliding clutch collars 48 and 50 as is well known in the art. Clutch collar 48 may also be utilized to clutch input gear 20 to the mainshaft 46 to provide a direct drive relationship between the input shaft 18 and the mainshaft 46. Preferably, each of the mainsection mainshaft gears encircles the mainshaft 46 and is in continuous meshing engagement with and is floatingly supported by the associated countershaft gear groups, which mounting means and special advantages resulting therefrom are explained in greater detail in above-mentioned U.S. Pat. Nos. 3,105,395 and 3,335,616. Typically, clutch collars 48 and 50 are axially positioned by means of shift forks or yokes 52 and 54, respectively, associated with a shift bar housing assembly 56 to be described in greater detail below. Clutch collars 48 and 50 are, in the preferred embodiment, of the well known non-synchronized double acting jaw clutch type.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially nondisplaced, nonengaged position as illustrated or in a fully rightwardly engaged or fully leftwardly engaged position.

Auxiliary transmission section 14 is connected in series with main transmission section 12 and is of the three-layer, four speed combined splitter/range type as illustrated in above-mentioned U.S. Pat. No. 4,754,665. Mainshaft 46 extends into the auxiliary section 14 and is journaled in the inward end of the output shaft 58 which extends from the rearward end of the transmission.

Auxiliary transmission section 14 includes, in the preferred embodiment thereof, a plurality of substantially identical auxiliary countershaft assemblies 60 (see FIG. 1A) each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78 which surrounds the output shaft 58. Accordingly, auxiliary section countershaft gears 68 and splitter gear 74 define a first gear layer, auxiliary section countershaft gears 70 and splitter/range gear 76 define a second gear layer and auxiliary section countershaft gears 72 and range gear 78 define a third layer, or gear group, of the combined splitter and range type auxiliary transmission section 14.

A sliding two-position jaw clutch collar 80 is utilized to selectively couple either the splitter gear 74 or the splitter/range gear 76 to the mainshaft 46 while a two-position synchronized clutch assembly 82 utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12 and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955 the disclosures of all of which are hereby incorporated by reference. The synchronized clutch assembly 82 illustrated is of the pin-type described in above-mentioned U.S. Pat. No. 4,462,489.

The splitter jaw clutch 80 is a two-position clutch assembly which may be selectively positioned in the rightwardmost or leftwardmost positions for engaging either gear 76 or gear 74, respectively, to the mainshaft 46. Splitter jaw clutch 80 is axially positioned by means of a shift fork 84 controlled by a two-position piston actuator 86 which is operable by a driver selection switch such as a button or the like on the shift knob (not shown) as is known in the prior art. Two-position synchronized clutch assembly 82 is also a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90, the actuation and control of which will be described in greater detail below.

Figure 2:
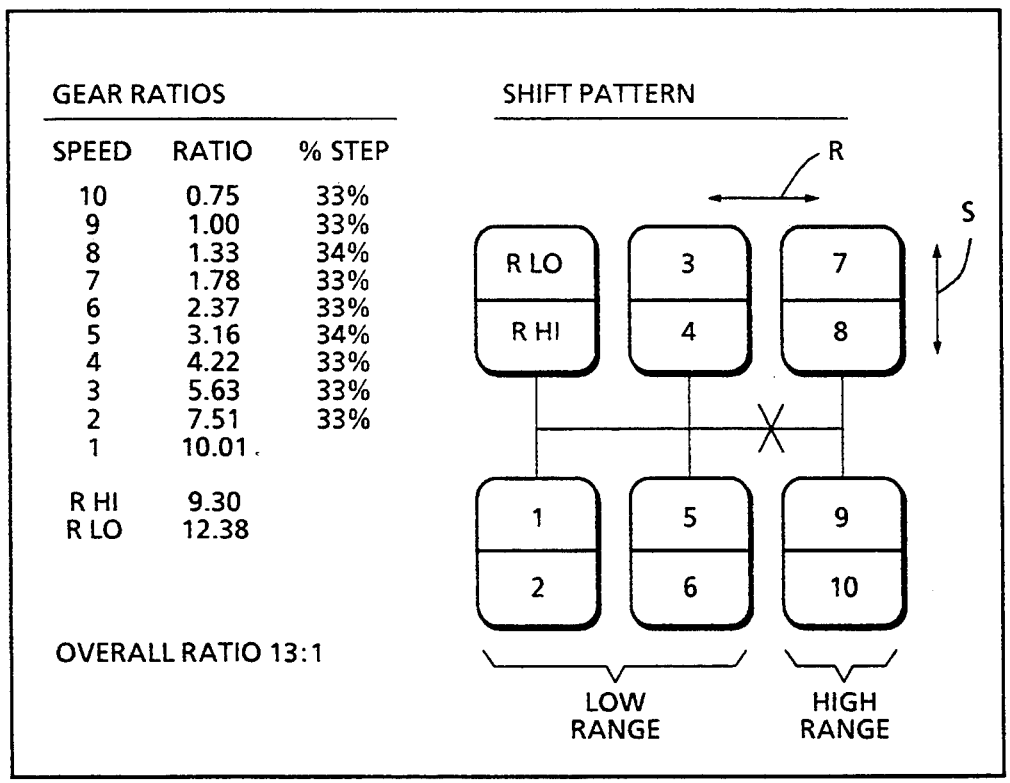
FIG. 2 illustrates a prior an shift pattern for the transmission of FIG. 1.

As may be seen by reference to FIGS. 1-2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three layer auxiliary section of the combined range and splitter type providing four selectable speeds or drive ratios between the input (mainshaft 46) and output (output shaft 58) thereof. The mainsection 12 provides a reverse and three potentially selectable forward speeds. However, one of the selectable mainsection forward gear ratios, the low speed gear ratios associated with mainshaft gear 42, is not utilized in the high range. Thus, transmission 10 is properly designated as a "(2+1)×(2×2)" type transmission providing nine or ten selectable forward speeds, depending upon the desirability and practicality of splitting the low gear ratio. While clutch 82, the range clutch, should be a synchronized clutch, double acting clutch collar 80, the splitter clutch, is not required to be synchronized.

According to the prior art, as disclosed in above-mentioned U.S. Pat. No. 4,944,197, the main section ratios are selected and implemented manually by a shift lever, splitter shifts are manually selected by operation of a manual selector lever or button, often located on the shift lever or built into the shift knob, and are implemented by a remote two-position actuator. The range shift is manually or automatically selected and implemented by a remote two-position actuator. A separate range control button/lever may be provided, or, as illustrated in FIG. 2, a lever operated "double H" type control may be utilized. Range and splitter actuators and controls of this type are well known in the prior art as may be seen by reference to U.S. Pat. No. 4,788,889, the disclosure of which is incorporated herein by reference.

The prior art shift pattern for shifting transmission 10 is schematically illustrated in FIG. 2. Divisions in the vertical direction at each gear lever position signify splitter shifts while movement in the horizontal direction from the three/four and five/six leg of the H pattern to the seven/eight and nine/ten leg of the H pattern signifies a shift from the low range to the high range of the transmission. As discussed above, splitter shifting is accomplished in the usual manner by means of a vehicle operator actuated splitter button or the like, usually a button located at the shift lever knob while operation of the range clutch shifting assembly is an automatic response to movement of the gear shift lever between the central and rightwardmost legs of the shift pattern as illustrated in FIG. 2 and will be described in greater detail below. Range shift devices of this general type are known in the prior art and may be seen by reference to above-mentioned U.S. Pat. Nos. 3,429,202; 4,455,883; 4,561,325 and 4,663,725.

Referring again to FIG. 2, and assuming that it is desirable that a transmission have generally equal ratio steps, the mainsection ratio steps should be generally equal, the splitter step should be generally equal to the square root of the mainsection ratio steps and the range step should equal about the mainsection ratio step raised to the N power where N equals the number of mainsection ratio steps occurring in both ranges (i.e., N=2 in the (2+1)×(2×2) transmission 10). Given the desired ideal ratios, gearing to approximate these ratios is selected. In the above example, the splitter steps are about 33.3% while the range step is about 316% which is generally suitable for a "2+1" main transmission section having about 78% steps as the square root of 1.78 equals about 1.33 and 1.78 raised to the second power (i.e. N equals 2) equals about 3.16.

The shift bar housing is provided with an opening 110 for receipt of a shift finger (not shown) carried by a shift lever or an X-Y device or the like.

To accomplish a shifting of the range section of the transmission 10 to achieve high range operation thereof, synchronized clutch assembly must be shifted to the leftwardmost position thereof as illustrated in FIG. 1. To accomplish this without requiring the operator to actuate any control device other than the gear lever movements to the rightwardmost leg of the shift pattern as seen in FIG. 2, the range control valve assembly 150 is provided. Briefly, a spring biased plunger member 156 connected to a master control valve 158 is axially aligned with the grooved portion 154 of a shift mechanism and, when forced radially outwardly causes the master valve 158 to provide a signal to a slave valve 160 located at piston assembly 90 to shift the shift fork 88 leftwardly as is shown. Positioning of the control shaft 100 the low range position causes the plunger 156 to extend radially inwardly causing the master valve 158 to signal the slave valve 160 to shift the shift fork rightwardly from the position shown in FIG. 1 to achieve a low range mode of operation.

Figure 4:
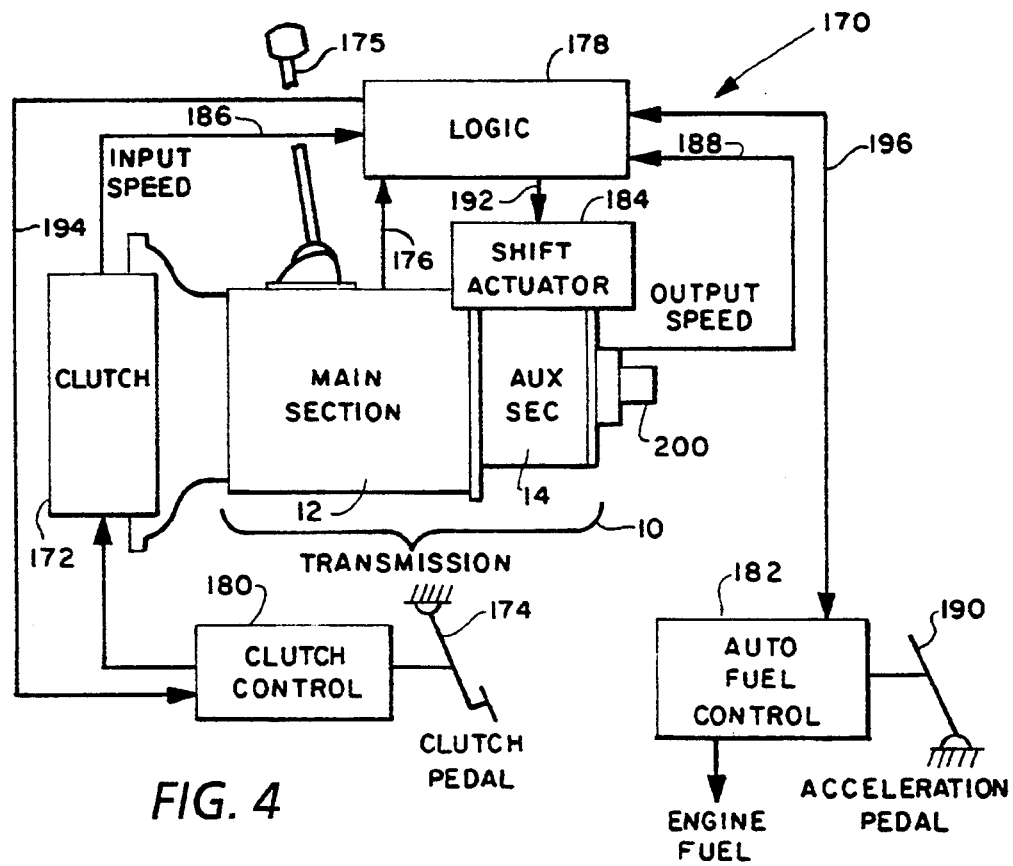
FIG. 4 is a block diagram of a semi-automatic shift implementation transmission system according to the present invention.

According to the present invention, the shifting of transmission 10 is semiautomatically implemented by the semi-automatic transmission system 170, illustrated in FIG. 4. A compound type transmission 10 comprising a main section 12 coupled to an auxiliary section 14 controlled by the shift control system/method of the invention is seen in FIG. 4. Main section 12 is operatively coupled to the drive shaft of the vehicle engine (not shown) by clutch 172 and output shaft 58 of auxiliary section is operatively coupled, commonly by means of a drive shaft, to the drive wheels of the vehicle (not shown).

The change gear ratios available from main transmission section 12 are manually selectable by first depressing clutch pedal 174 to disengage the engine drive shaft and then positioning the shift lever 175 according to the shift pattern prescribed to engage the particular change gear ratio of main section 12 desired.

The shift control system/method of the invention is operative to initiate and enable automatic shifting between the sequentially related gear ratios within each main section grouping. The control system of the invention includes means for sensing and providing a suitable signal 176 to means operative to enable automatic shifting at the particular gear position desired. The means operative to enable automatic shifting includes logic circuitry 178, possibly clutch control 180, auto fuel control 182 and shift actuator 184. Logic circuitry 178 is preferably microprocessor based and is operative to receive and operate upon information including input speed signal 186, possibly a gear ratio position signal 176, output speed 188, and accelerator pedal position 190 to initiate and provide automatic splitter shifting as required by the invention. Generally, automatic shifting is accomplished by shift actuator 184 including valves and the like well known to those skilled in tile art according to tile nature of a command output signal 192 are received from logic circuitry 178 which, in turn, provides command output signal 196 to automatic fuel control 182 relative manual operation of accelerator pedal 190 in addition to information concerning output speed of output shaft provided logic circuitry 178 by sensor 200. A command output signal 194 to clutch control 180 for automatic operation of clutch 172 may also be provided but is not necessary.

The above described means by which automatic shifting is effected is well known to those skilled in the art excepting that it becomes operable only when any gear ratio included in the group of splitter gear ratios for a particular main section gear ratio is manually engaged by the operator. Examples of such automatic shifting may be appreciated in greater detail by reference to U.S. Pat. Nos. 4,361,060; 4,527,447; and 3,478,851, the disclosures of all of which are included herein by reference.

The shift logic unit may be of the type disclosed in U.S. Pat. No. 4,595,986, the disclosure of which is incorporated by reference.

Figure 3:
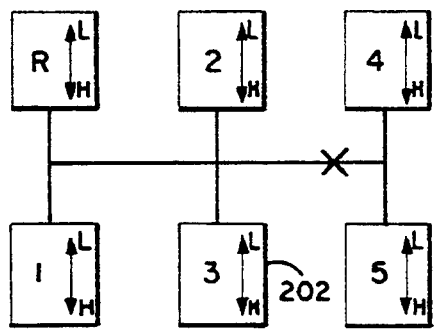
FIG. 3 illustrates a shift pattern for the transmission of FIG. 1 according to the present invention.

The shift pattern for transmission system 170 is illustrated in FIG. 3. As may be seen, upon manual selection of the low range third speed main section position or group 202, both the low ("L") and high ("H") splitter ratios are automatically provided. "3L" and "3H" in FIG. 3 correspond to ratios "5" and "6" of the prior art shift pattern of FIG. 2.

Shifting from the 202 position to the high range, second speed main section position or group 204, will involve a "double H" type range shift and will make both "4L" and "4H" automatically available. The "4L" and "4H" ratios, respectively, correspond to ratios "7" and "8", respectively, illustrated in FIG. 2.

Once the operator manually selects one of the splitter groups, 1, 2, 3 (202), 4 (204) or 5, the system will automatically select the particular splitter ratio ("H" or "L") within that group that is most desirable and will automatically engage that ratio.

Figure 5:
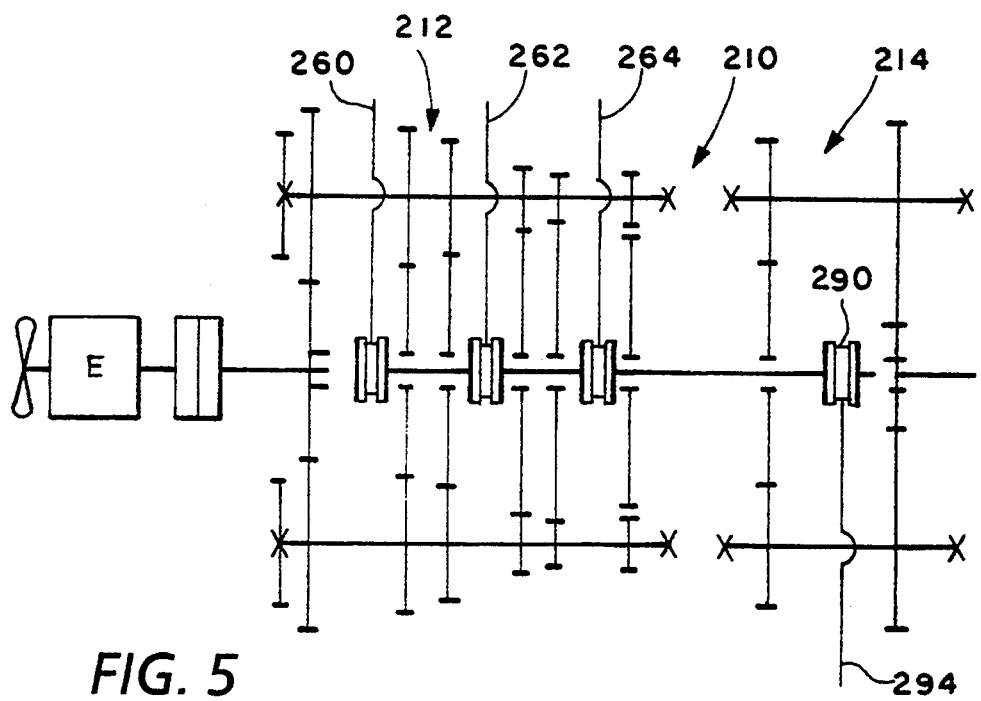
FIG. 5 illustrates a splitter type compound transmission.
Figure 5A:
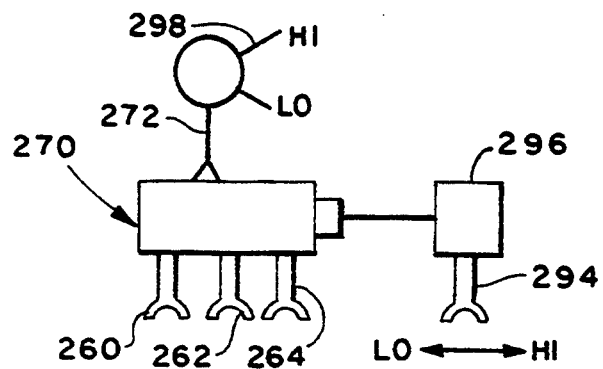
FIG. 5A illustrates a prior an control for the transmission of FIG. 5.
Figure 6:
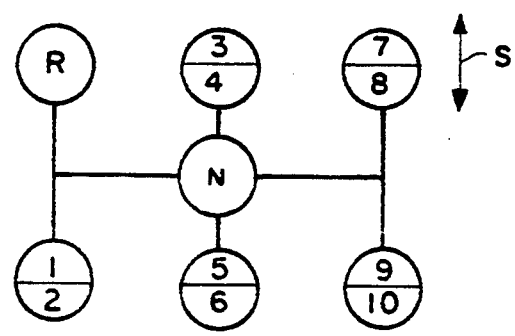
FIG. 6 illustrates the shift pattern for the transmission of FIGS. 5 and 5A.

FIGS. 5 and 6 schematically illustrate a 10-speed splitter only type compound transmission 210 comprising a five forward speed main transmission section 22 and a two-speed splitter type auxiliary transmission section 214. The prior art shift pattern for transmission 210 is illustrated in FIG. 6. The prior art transmission utilized a shift lever 272 cooperating with a shift bar assembly 270 and shift forks 260, 262 and 264 to control the main section and an auxiliary actuator 296 and shift fork 294 to control the auxiliary splitter clutch 290. A button 298 on the shift lever and a master valve (not shown) controlled the auxiliary slave actuator 296.

Figure 7:
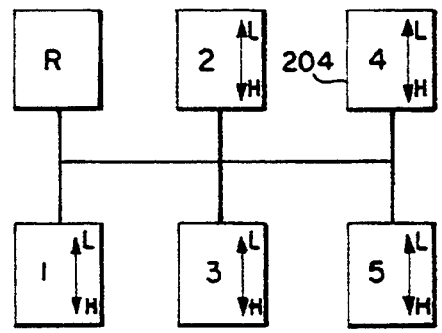
FIG. 7 illustrates a shift pattern for the transmission of FIG. 5 according to the present invention.

By utilizing a semi-automatic transmission system similar to system 170 illustrated in FIG. 4 to control transmission 210 for automatic splitter shifting, the shift pattern of FIG. 7 is obtained.

It is noted that the shift pattern of FIG. 3, and especially of FIG. 7, achieved by utilizing the control Method/system of the present invention provides shifting of compound transmissions with the ease of shifting simple passenger car manual transmissions.

Although the present invention has been described with a certain degree of particularity, it is understood that various changes to form and detail may be made without departing from the spirit and the scope of the invention as hereinafter claimed.

I claim:

1. A semi-automatic mechanical transmission system comprising a shift control system and a splitter type compound vehicular transmission having a main section connected in series with an auxiliary section including splitter gearing, said transmission having a plurality of groups of forward gear ratios with each of said groups (i) being manually selectable by an operator, (ii) corresponding to a particular transmission main section ratio and (iii) including a plurality of sequentially related splitter gear ratios, said transmission including actuator means enabling automatic splitter shifting between the sequentially related gear ratios within said groups, and said control system operable to command the actuator means to effect automatic splitter shifting between the sequentially related gear ratios within said groups when one of said groups is manually selected by the operator.

2. The transmission system of claim 1 wherein said transmission is a combined range and splitter type compound transmission, said auxiliary section also includes range gearing and said control system includes means for sensing manual selection of a range shift and for implementing a selected range shift.

3. A shift control method for semi-automatic shifting of a splitter type compound vehicular transmission said transmission having a main section connected in series with an auxiliary section including splitter gearing, said transmission having a plurality of groups of forward gear ratios with each of said groups being manually selectable by a vehicle operator, corresponding to a particular transmission main section ratio and including a plurality of sequentially related splitter gear ratios, said transmission including actuator means enabling automatic splitter shifting between the sequentially related splitter gear ratios within said groups, and said control system including means for sensing when one of said groups is manually selected by the operator, said method comprising:

sensing selection of a particular group by a vehicle operator, and causing automatic splitter shifting between the sequentially related ratios within each of said groups.

* * * * *